United States Patent [19]

Cadwell

[11] Patent Number: 5,028,876
[45] Date of Patent: Jul. 2, 1991

[54] PRECISION CAPACITIVE TRANSDUCER CIRCUITS AND METHODS

[75] Inventor: Robert M. Cadwell, Los Altos, Calif.

[73] Assignee: Dresser Industries, Inc., Dallas, Tex.

[21] Appl. No.: 462,448

[22] Filed: Jan. 18, 1990

Related U.S. Application Data

[63] Continuation-in-part of Ser. No. 304,359, Jan. 30, 1989.

[51] Int. Cl.$^5$ .......................................... G01R 27/26
[52] U.S. Cl. ............................... 324/678; 324/660;
324/661; 340/870.37; 73/724
[58] Field of Search ............... 324/661, 662, 678, 681,
324/679, 660, 658; 340/870.37; 73/724, 718

[56] References Cited

U.S. PATENT DOCUMENTS

| | | |
|---|---|---|
| 3,595,084 | 7/1971 | Bailey . |
| 3,688,206 | 8/1972 | Eide . |
| 3,729,991 | 5/1973 | Hardway, Jr. . |
| 3,750,476 | 8/1973 | Brown . |
| 3,858,097 | 12/1974 | Polye . |
| 3,877,313 | 4/1975 | Ferriss . |
| 3,883,826 | 5/1975 | Kirby . |
| 3,952,234 | 4/1976 | Birchall . |
| 3,965,746 | 6/1976 | Rabek . |
| 4,045,833 | 10/1977 | Briefer .............................. 324/678 X |
| 4,092,696 | 5/1978 | Boesen et al. . |
| 4,093,915 | 6/1978 | Briefer . |
| 4,094,199 | 6/1978 | Holdren et al. . |
| 4,096,758 | 6/1978 | Moore ................................ 73/718 |
| 4,122,708 | 10/1978 | Maier . |
| 4,193,063 | 3/1980 | Hitt et al. . |
| 4,211,971 | 7/1980 | Kobayashi et al. . |
| 4,227,419 | 10/1980 | Park . |
| 4,292,632 | 9/1981 | Yeakley . |
| 4,295,376 | 10/1981 | Bell . |
| 4,336,718 | 6/1982 | Washburn . |
| 4,339,709 | 7/1982 | Briefer ............................. 324/679 X |
| 4,381,677 | 5/1983 | Ruesch et al. ..................... 73/724 X |
| 4,386,312 | 5/1983 | Briefer . |
| 4,389,646 | 6/1983 | Tago ............................. 324/662 X |
| 4,392,382 | 7/1983 | Myers . |
| 4,392,383 | 7/1983 | Bauerlen et al. ................. 73/718 X |
| 4,398,194 | 8/1983 | Johnston . |
| 4,509,007 | 4/1985 | Barsotti et al. . |
| 4,517,622 | 5/1985 | Male . |
| 4,584,885 | 4/1986 | Cadwell . |
| 4,775,830 | 10/1988 | Lyyra ............................. 324/678 X |
| 4,791,352 | 12/1988 | Frick et al. . |

FOREIGN PATENT DOCUMENTS 0016696  6/1978  Japan .

OTHER PUBLICATIONS

An MOS Switched-Capacitor Readout Amplifier for Capacitive Pressure Sensors, by Y. E. Park and K. D. Wise, 12/1983.
A High-Performance Silicon Tactile Imager Based on a Capacitive Cell, by Kukjin Chun and Kensall D. Wise, 12/1985.
An MOS Switched-Capacitor Interface for Capactive Pressure Sensors, by Yong Eue Park, 12/1983.
Development of an Integrated Circuit Capacitive Pressure Transducer, by Yeun-Ding Hong, 12/1981.
A Capacitive Pressure Transducer Integrated with CMOS Circuits, by Wei-Jiun Shen, 12/1983.
The Design of an Integrated Circuit Capacitive Pressure Transducer, by Thomas Mark Grill, 12/1978.

Primary Examiner—Kenneth Wieder
Assistant Examiner—Robert W. Mueller
Attorney, Agent, or Firm—Richards, Medlock & Andrews

[57] ABSTRACT

A method and means for determining the deflection of a movable element in a transducer by measurement of capacitance. The result is independent of extraneous capacitance between the transducer terminals and the environment, of the magnitude of the transducer capacitance, and of scaling factors within the measurement circuits. The difference and sum of differential capacitances are determined, preferably independently of their individual values, using switching techniques and a common measurement circuit. The ratio of differential capacitances is determined by causing the measurement signal for one capacitance to be inversely proportional to the magnitude of the other capacitance.

47 Claims, 6 Drawing Sheets

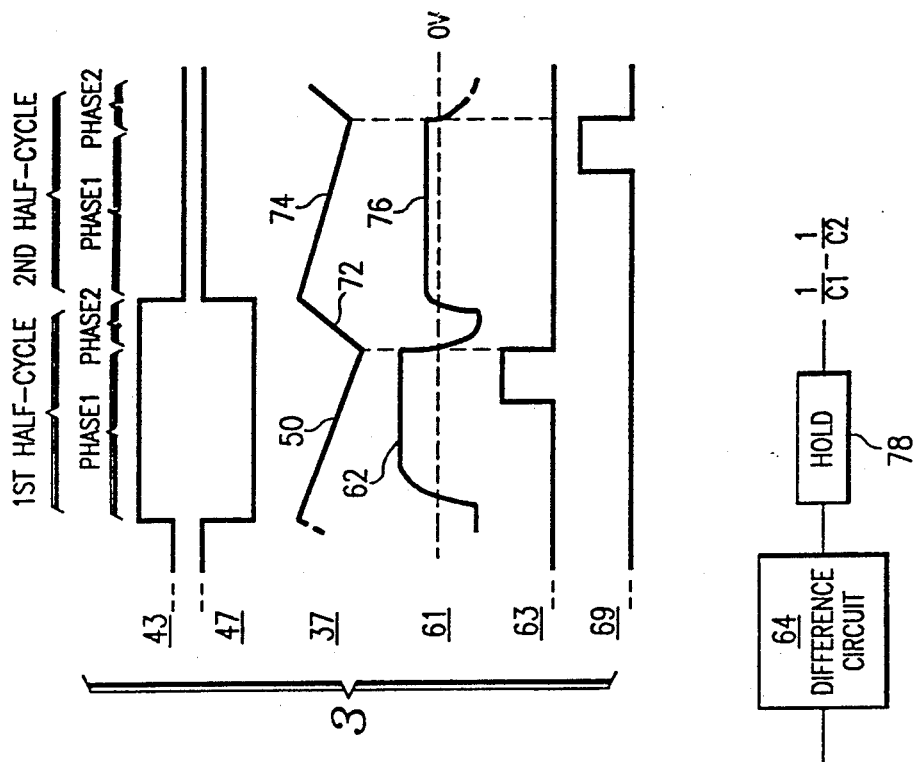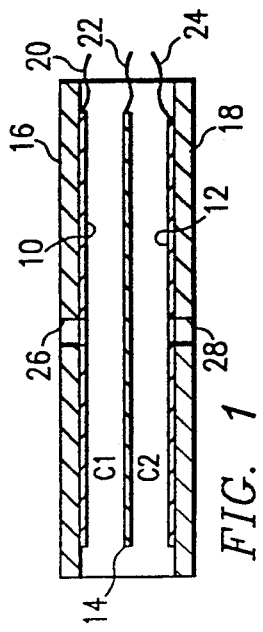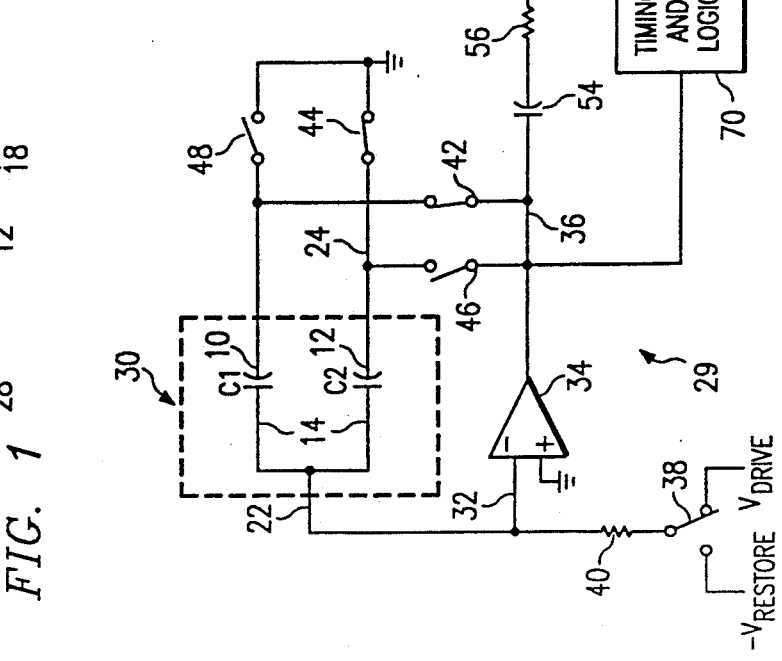

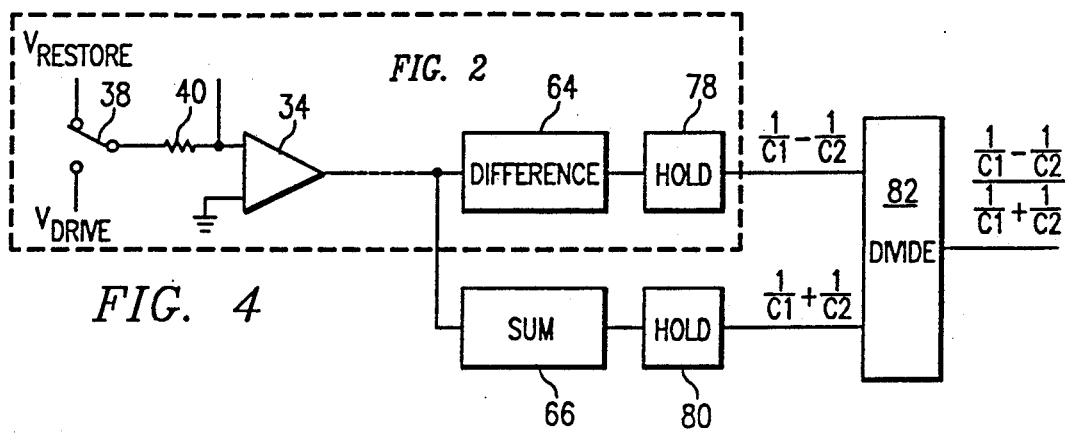
FIG. 4
FIG. 2
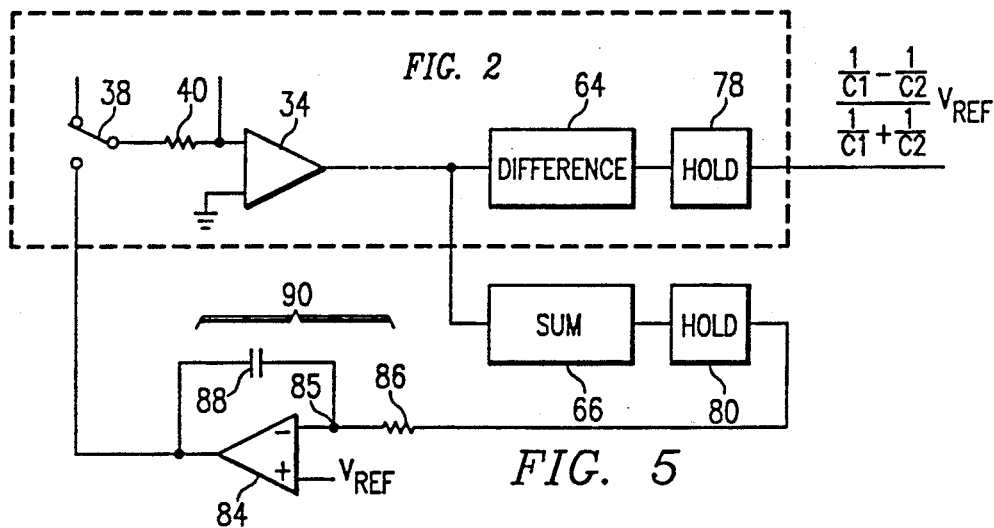
FIG. 2
FIG. 5
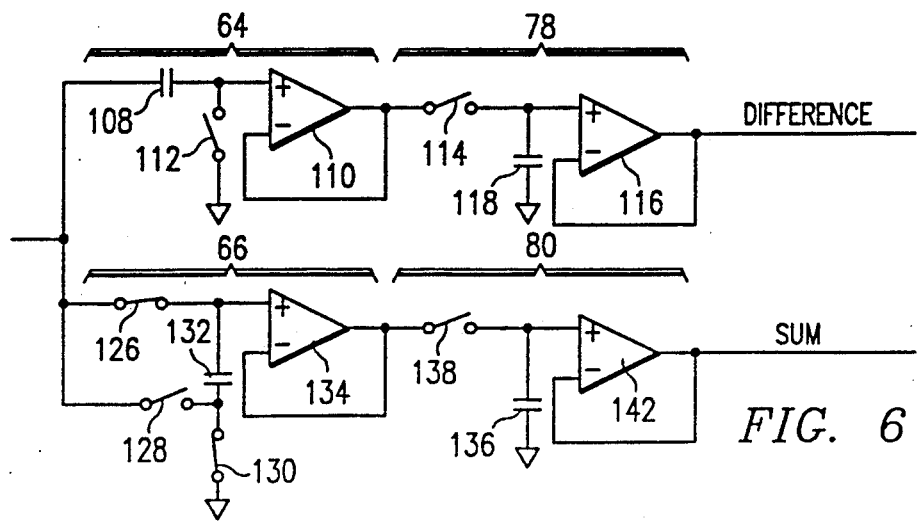
FIG. 6

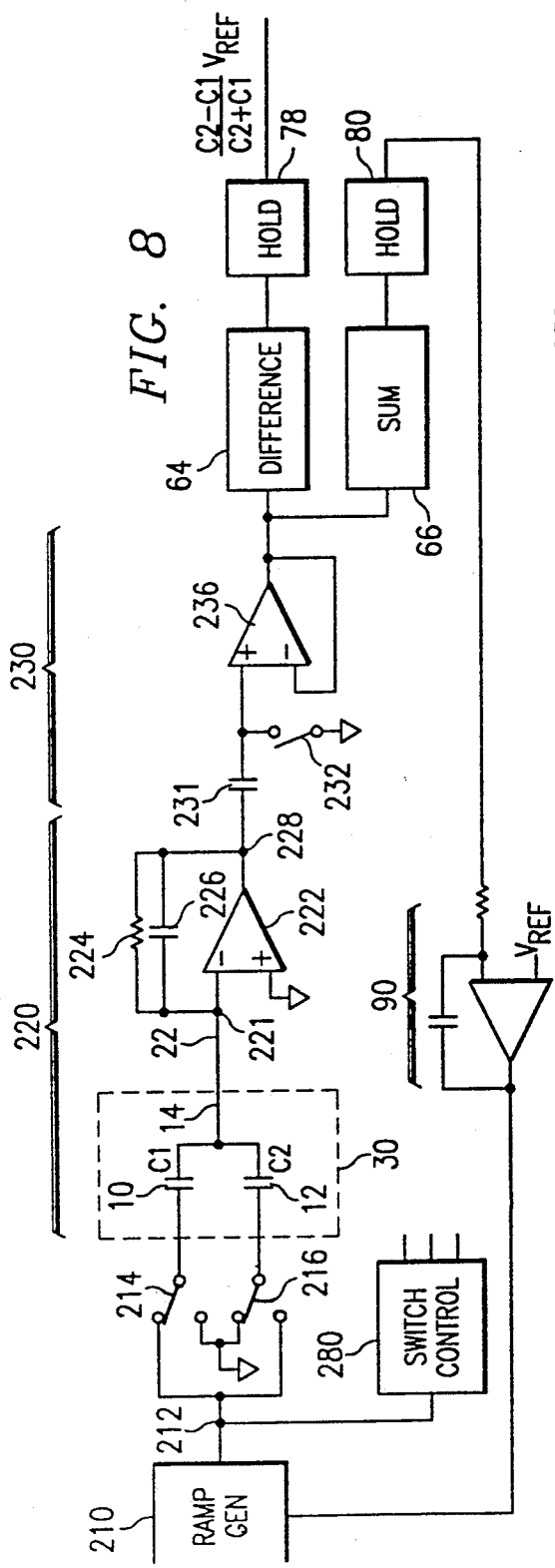
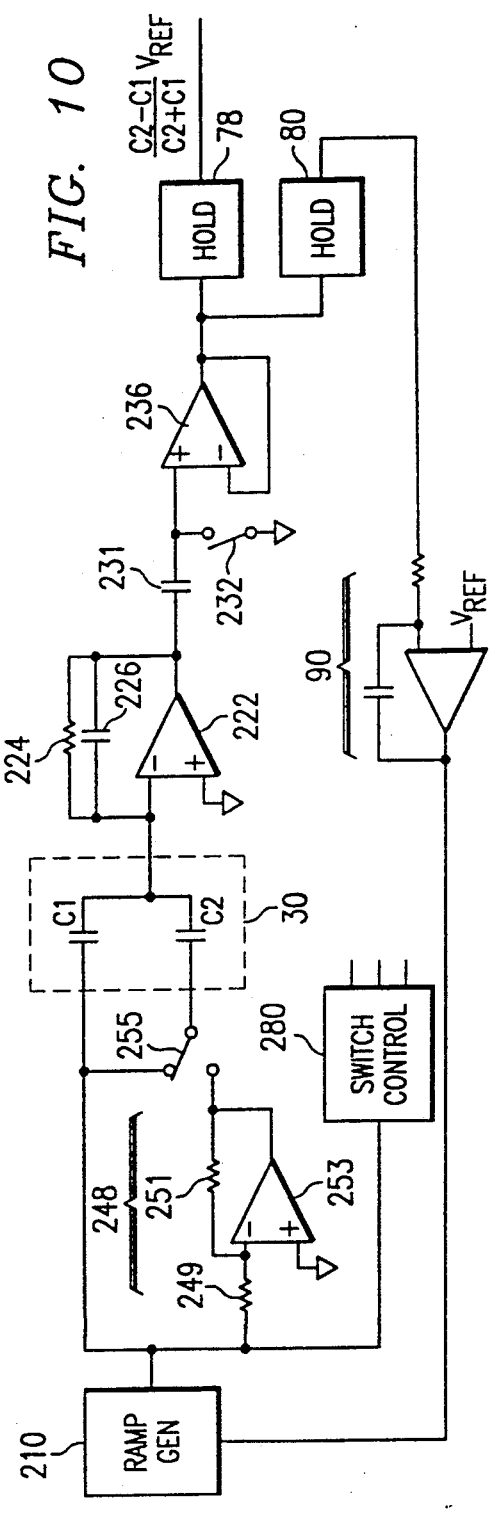

PRECISION CAPACITIVE TRANSDUCER CIRCUITS AND METHODS

RELATED APPLICATION

This is a continuation-in-part application of pending U.S. application entitled "Precision Transducer Circuit and Linearization Method", Ser. No. 304,359, filed Jan. 30, 1989.

TECHNICAL FIELD OF THE INVENTION

The present invention relates in general to circuits and techniques for converting transducer parameters into corresponding electrical signals, and more particularly to the accurate measurement and conversion to electrical output of capacitance produced by capacitance transducers as used in pressure sensors, accelerometers, microphones and other transducers.

BACKGROUND OF THE INVENTION

Many kinds of transducers have been conceived to convert a variety of physical effects into a corresponding movement of a transducer element with respect to one or more other fixed elements. The relative position of the movable element is a measure of the physical effect. For example, pressure transducers are responsive to an input fluid pressure to deflect the movable element.

While it would be highly desirable to sense the position of the movable element directly, small changes in miniature transducers are often at the atomic level and thus not measurable with practical equipment. A common method of determining the position of the movable element is to measure the electrical capacitance between it and the fixed elements. Sophisticated circuits are utilized to very accurately transform the capacitance into corresponding electrical signals which are representative of the pressure, acceleration, etc., to which the transducer is responsive.

Typical capacitive displacement type transducers include two capacitors, one (C1) existing between a first plate and the movable element, and the second capacitor (C2) existing between a second plate and the movable element. As the movable element moves toward one plate or the other in response to input changes, the capacitances between the movable element and the two plates change accordingly. Therefore, by measuring the capacitances between the movable element and the plates, the amount of deflection can be measured. This nominally balanced structure provides a natural zero (equal capacitances with no input) and a structure which responds to inputs of either polarity.

The trend in transducer manufacture, at least with the capacitive displacement type transducer, is to reduce the size of the device. This is due primarily to the fabrication of silicon structures according to current silicon processing techniques. Hence, by reducing the size of the structure, many more devices can be fabricated from a silicon wafer, thereby decreasing the cost. However, smaller structures result in smaller transducer capacitances and smaller changes of capacitance in response to input changes, the result of which must be accurately sensed by associated electrical circuits.

The measurement of the transducer capacitances must be made independently of the unavoidable extraneous stray capacitances between the transducer elements and the environment, which do not respond to the input. As transducer devices become miniaturized, the stray capacitance becomes very significant, often being of the same magnitude as the capacitance of the transducer capacitors C1 and C2 being measured. This can be appreciated in view that with miniature transducers, the total capacitance may be in the neighborhood of several picofarads, with significant changes in the capacitance due to input changes being a matter of femtofarads.

Further, traditional transducer circuits introduce additional parasitic parameters, such as input capacitance, which can have an increasing effect on accuracy as the capacitance of the transducer is reduced.

Further still, traditional transducer circuits often produce an output which is proportional to the difference of the transducer capacitances, (C1-C2). This function produces an output which is very non-linear for significant deflections of the movable element, since the deflection is approximately proportional to the reciprocal of capacitance. This leads to complex linearization corrections or the restriction of the deflection of the movable element, with a resulting reduction of sensitivity.

Further still, traditional transducer systems are subject to many sources of scaling errors, wherein the sensitivity is affected by various parameter variations. For example, the transducer capacitances are directly proportional to the dielectric constant of the fluid between the capacitor elements. A change of the dielectric constant, caused by a change of fluid type, humidity, temperature or other variables, will change the sensitivity of the transducer. Also, the sensitivity is affected by changes of the dimensions of the transducer, such as caused by thermal expansion or contraction, since the capacitances are dependent on the area of the capacitance elements and spacings between them. In addition, the electrical output resulting from the transducer capacitances is often directly related to the values of resistors, capacitors and other components in the electronics which exhibit instabilities and temperature sensitivities. This leads to the use of precision and costly components.

A method for eliminating the effects of stray capacitance from the transducer elements to the environment and parasitic circuit capacitance is disclosed in U.S. Pat. No. 4,584,885. However, the output of the described circuits is proportional to (C1-C2) and is thus non-linear for significant displacements. Since the described application involves a force-feedback system, in which the movable element experiences no displacement, non-linearity from this source is not an issue. However, in any transducer wherein the output is a function of the displacement, this source of non-linearity is critical. Further, the method described in the noted patent does not address the effects of variation of scaling factors in the transducer or the circuit on the system.

It can be seen that a need exists for a transducer system in which a miniature transducer and associated circuit provides enhanced linearity and is not sensitive to stray capacitance from the transducer elements to the environment, dielectric constant variations, scaling of the transducer dimensions, parasitic circuit parameters and circuit component value variations. Another need exists for a transducer circuit which is cost effective and easily manufactured.

SUMMARY OF THE INVENTION

According to the invention, there are disclosed circuits and techniques for producing an electrical output from a capacitance transducer system in response to deflections of the transducer movable element, which output is linear and independent of stray capacitance from the transducer elements to the environment, independent of dielectric constant variations, scaling of the transducer dimensions, parasitic circuit parameters and circuit component value variations.

According to one embodiment of the invention, a signal is generated which represents the difference of the reciprocals of each of the transducer capacitances C1 and C2, such that the output signal represents:

$$\frac{1}{C1} - \frac{1}{C2}$$

The reciprocal value of the capacitances is obtained directly by circuitry, without performing an actual division. Both values are processed through a common channel to avoid the effect of potential differences between separate processing channels. The difference is created at the output without effect on the values. This use of reciprocals provides greatly improved linearity compared to methods which use only the difference of the capacitances.

According to another embodiment of the invention, the output signal represents the difference of the reciprocals of the transducer capacitances, divided by the sum of the reciprocals of the capacitances, such that the output signal represents:

$$\frac{\frac{1}{C1} - \frac{1}{C2}}{\frac{1}{C1} + \frac{1}{C2}}$$

The result of the division is to remove all scaling effects, both in the transducer and the electronics. Thus, the output is independent of dielectric coefficient, dimensional scaling of the transducer, circuit component values, etc. A common channel is again used, and the difference and sum is created at the output without effect on the values.

According to yet another embodiment of the invention, the effect of the division is accomplished by maintaining the denominator equal to a constant by means of feedback to the transducer excitation signal, without effect on the ratio, thereby avoiding the need to actually perform the division. The output is proportional to this constant, which may be a precision reference voltage.

According to an embodiment of the invention, the output signal is representative of:

$$\frac{C2 - C1}{C2 + C1}$$

It is recognized that this quantity is algebraically equivalent to the above ratio of the difference of the reciprocals to the sum of the reciprocals. Therefore, equivalent results can be obtained using either method. However, this second form is more easily implemented. A common channel is used, and the difference and sum is created at the output without effect on the values. The effect of the division is accomplished by maintaining the denominator equal to a constant, without effect on the ratio, and the output is proportional to this constant.

According to another embodiment of the invention, the difference and sum of the capacitances are derived directly at the input of the electronics. This results in yet further circuit simplification, but the output is sensitive to the ratio of two resistors.

According to another embodiment of the invention, the output signal is representative of:

$$\frac{C1}{C2} - 1$$

This results in further circuit simplification, provides improved sensitivity, but does not provide the desired ideal linearity, which may be corrected by other means, and the output is sensitive to the ratio of two resistors. The capacitance ratio is derived directly at the input of the electronics, avoiding the measurement of the individual capacitances and the division process. The output is proportional to a reference voltage.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts or elements throughout the views, and in which:

FIG. 1 is a simplified schematic representing a cross section of a capacitive displacement type of transducer;

FIG. 2 is a circuit diagram showing an embodiment of the invention in which signals representative of the reciprocals of the transducer capacitances C1 and C2 are directly generated in sequence, using a common channel, and an output friction is generated representative of the the reciprocals;

FIG. 3 comprises a series of waveforms of the circuit of FIG. 2;

FIG. 4 is a circuit diagram showing an alternative embodiment of the circuit shown in FIG. 2, in which a signal is generated representative of the sum of the reciprocals, and an output function is generated represent at the difference divided by the sum;

FIG. 5 is a circuit diagram showing an alternative embodiment of the circuit shown in FIG. 4, in which the sum signal is held constant by means of feedback, thereby providing the effect of division;

FIG. 6 is a circuit diagram showing an embodiment of difference, sum and hold circuitry which may be used in various of the invention;

FIG. 8 is a circuit diagram showing an embodiment in which signals representative of the transducer capacitances C1 and C2 are directly generated in sequence, using a common channel; difference and sums signals are generated, and an output function representative of the ratio of the difference to the sum is generated, wherein the sum signal is held constant by means of feedback, thereby providing the effect of division;

FIG. 10 is a circuit diagram showing an alternative embodiment in which signals representative of the difference and sum of transducer capacitances C1 and C2 are directly generated in sequence, using a common channel, and an output function representative of the ratio of the difference to the sum is generated, wherein the sum signal is held constant by means of feedback, thereto providing the effect of division;

DETAILED DESCRIPTION OF THE INVENTION

Figure 7:
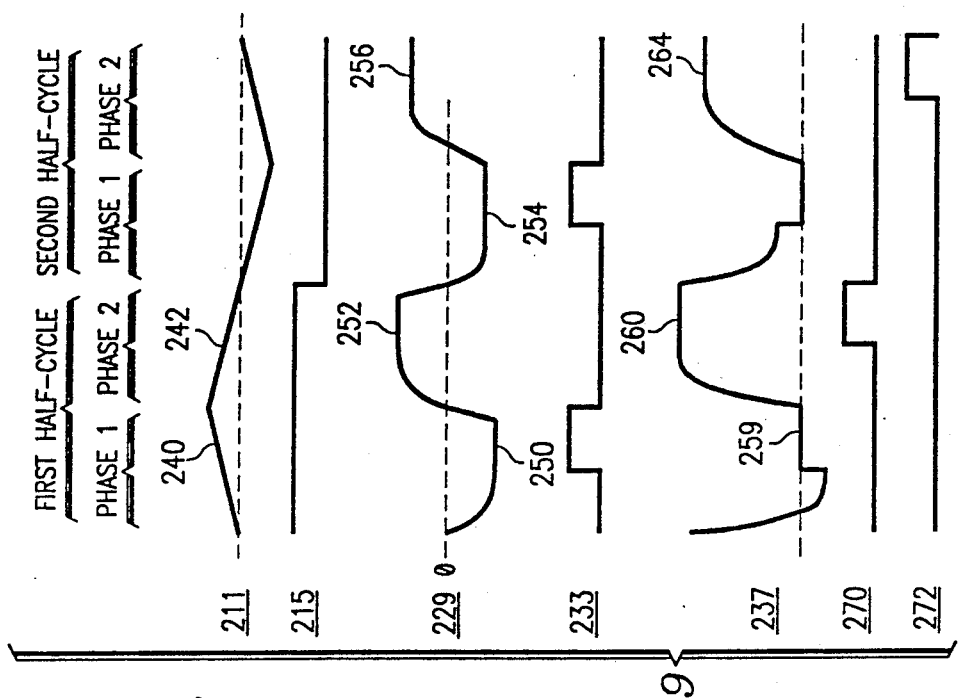
FIG. 7 comprises a series of waveforms depicting the performance of the circuit of FIG. 6.

Referring to FIG. 1, there is depicted in simplified form a portion of a transducer of the type having a first plate 10, a second plate 12, and a movable element 14 disposed therebetween. The capacitive transducer structure generally comprises a pair of spaced apart conductive plates formed on glass insulator supports 16 and 18, with a movable element 14 mounted therebetween. Three conductors 20-24 provide electrical connections to the plates 10 and 12 and the movable element 14. Holes 26 and 28 formed in the support structure of the transducer allow pressure differentials to deflect the movable element 14. The deflection of the movable element 14 causes a change in the capacitances C1 and C2 of the transducer. The sensing of the capacitance can be correlated to the position of the movable element, and thus to the fluid pressure acting on it. A miniature transducer of such type is described in copending U.S. application entitled, "High Sensitivity Miniature Pressure Transducer," Ser. No. 304,344, filed Jan. 30, 1989. The disclosure of the noted application is incorporated herein by reference. In the preferred form of the invention, the circuits described below are employed with a capacitive transducer of the clamped diaphragm type.

Although the transducer shown is responsive to pressure inputs, any type of input effect that causes a deflection of the movable element can be measured similarly.

The parameter of interest is the displacement of movable element 14 from the nominally centered location, defined by a distance x. This distance x can be determined by measuring the capacitances between the movable element 14 and the respective plates 10 and 12. As can be appreciated, x is proportional to $(d_1-d_2)$, where $d_1$ and $d_2$ define the distance from each plate 10 and 12 to the undeflected movable element 14. According to well known relationships, the capacitance is a function of the area of and the distance between the plates 10 and 12 and the movable element 14. Ignoring various constants, and assuming equal plate areas:

$$\text{capacitance} = \text{area} / \text{distance}$$

so $$d1 = \frac{a}{C1}, d2 = \frac{a}{C2}$$

Thus, $$x = d1 - d2 = \frac{a}{C1} - \frac{a}{C2} = a\left[\frac{1}{C1} - \frac{1}{C2}\right]$$

To maintain the linearity of the system, the measurement of the displacement of the movable element must consider the difference of the reciprocal capacitances.

If the movable element is not a flat plate, but rather has some curvature, x represents the average displacement based upon the net measured capacitance. The linearity of the system may be affected somewhat, but the reciprocal capacitance remains the best choice as a measure of the displacement.

According to other well known principles, if a capacitor is charged with a constant current, the voltage across the capacitor increases linearly with time, producing a voltage ramp of constant slope:

$$\frac{1}{c} = \frac{e}{i\,t}$$

Since $e/t$ defines the slope, $$\frac{1}{c} = \frac{1}{i} \times \text{slope}.$$

If, as noted above, the current, i, is held constant, $$\frac{1}{c} = \text{constant} \times \text{slope}.$$

A circuit embodying the principles and concepts of the invention is described below for measuring the reciprocals of the transducer capacitances by means of measuring the slope of the voltage ramp derived from charging the transducer capacitances with a constant current, and for responding to the difference of the measurements, i.e., $(1/C1 - 1/C2)$. The effect of stray capacitance to the environment and parasitic circuit capacitances is eliminated by ensuring that the charging current flows only through the transducer capacitances and that the voltage measured is due only to the charging current.

In the circuit embodiment shown in FIG. 2, the transducer capacitance is shown generally as reference 30. The transducer capacitances C1 and C2 are alternately connected to an integrator circuit 29, producing an output signal which is a voltage ramp, and the slope of which is alternately proportional to the reciprocal of the transducer capacitances, 1/C1 or 1/C2. Differentiator circuit 51 produces an output signal, which is proportional to the integrator output slope, and thus proportional to 1/C1 or 1/C2. Difference circuit 64 derives the difference of the two, representing the difference of the reciprocal transducer capacitances, $(1/C1 - 1/C2)$. Hold circuit 78 retains this difference value, which is the desired output. Difference circuit 64 and hold circuit 78 are capacitor charge type circuits described below.

Integrator circuit 29 is comprised of transducer capacitances 30, resistor 40, differential amplifier 34 and switches 42-48. The waveform diagrams of FIG. 3 depict the circuit operation during one measurement cycle composed of two similar half-cycles. During the first half-cycle, switches 42 and 44 are closed by waveform 43 and switches 46 and 48 are opened by waveform 47. The plate 10 of transducer capacitance C1 is thus connected to the output of amplifier 34, node 36, and plate 12 of C2 is connected to ground. For purposes of understanding, the circuit is shown using mechanical switches, however, in practice, high speed solid state switching devices would be employed. The common lead 22 of the transducer connects movable element 14 to the inverting input of amplifier 34, node 32. Amplifier 34 functions as an operational integrator which operates according to well known principles. The non-inverting input of amplifier 34 is connected to circuit ground to establish the inverting input, node 32, at a virtual ground, or zero voltage potential, by means of feedback through the switched transducer capacitance.

During the first part of this first half-cycle, phase 1, switch 38 is switched so as to apply a positive drive voltage Vdrive to one end of resistor 40. Since the other end of resistor 40 at node 32 is maintained at a virtual ground potential, a constant measurement current flows through resistor 40 and thus through the transducer capacitance C1. The input current of amplifier 34 is negligible and does not affect the measurement current. The output of amplifier 34, node 36, is a voltage which decreases linearly with time, as shown by portion 50 of waveform 37.

The capacitance between input node 32 and ground is comprised of stray capacitance associated with the transducer movable element 14, input capacitance associated with the circuitry itself and transducer capacitance C2 which has been connected to ground by switch 44. Since this node is at virtual ground, the voltage across this capacitance cannot change, and substantially no current can flow through it. This prevents any diversion of the measurement current from transducer capacitance C1. Further, the current required to charge stray capacitance to ground associated with plate 10 of C1 is provided by the output of amplifier 34 and does not affect the voltage developed across capacitance C1.

Thus, the output signal of integrator circuit 29, i.e., portion 50 of waveform 37, is a voltage ramp the slope of which is proportional to the reciprocal of transducer capacitance C1, and is unaffected by stray capacitance from the transducer leads to the environment or circuit input capacitance.

Differentiator circuit 51 is comprised of differential amplifier 52, coupling capacitor 54, resistors 56 and 58, and diode 60. According to well understood principles, the output of a differentiator is proportional to the rate of change, or slope, of the applied voltage. In particular, the non-inverting input of differential amplifier 52 is connected to circuit ground, establishing the inverting input at virtual ground by means of feedback through resistor 58. The output of integrator circuit 29, waveform 37, is applied to coupling capacitor 54, the other end of which is at virtual ground, ignoring the effect of compensating resistor 56. The constant slope of the input causes a constant current to flow through capacitor 54 and thus through resistor 58, producing a constant output voltage level, shown as portion 62 of waveform 61. This voltage level is proportional to slope 50 and thus to the reciprocal of the transducer capacitance C1. Difference circuit 64 samples this level during the latter part of phase 1, as indicated by waveform 63, after allowing time for the differentiator circuit to stabilize.

A timer in switch control circuit 70 terminates phase 1 of the first half-cycle, whereupon phase 2 of the first half-cycle begins. During the second phase, switch 38 is moved so as to connect a negative voltage Vrestore to resistor 40, causing the output of integrator circuit 29 to linearly increase, as shown by portion 72 of waveform 37. When the output voltage of integrator amplifier 34 reaches approximately zero volts, switch control circuit 70 terminates phase 2 and thus the first half-cycle. No measurement is made during phase 2, the purpose of which is to reduce the voltage across the transducer capacitance C1, and thus its stored charge, to substantially a zero value. This action results in negligible circuit transients when C1 and C2 are switched for the next half-cycle. Because the positive slope 72 can be very high, potentially overloading differentiator circuit 51, the output level of amplifier 52 is limited by diode 60. Resistor 56 is included to provide frequency compensation for differentiator circuit 51 and does not affect the differentiator output level during the time it is sampled by the following difference circuit 64.

The operation of the second half-cycle is similar to that for the first, but the connection of the transducer capacitances C1 and C2 is reversed by reversing switches 42–48, as shown by the state of waveforms 43 and 47 during the second half-cycle. During phase 1 of the second half-cycle, the output of integrator circuit 29, portion 74 of waveform 37, has a negative slope proportional to the reciprocal of transducer capacitance C2. The output level of differentiator circuit 51, portion 76 of waveform 61, is proportional to the reciprocal of C2, which is sampled by difference circuit 64 at the time indicated by waveform 69.

During phase 2 of this second half-cycle, the voltage across C2 is restored to zero in a manner similar to that described above, thus completing an entire measurement cycle.

Difference circuit 64 produces an output equal to the difference of the levels at portions 62 and 76 of waveform 61, and thus proportional to $(1/C1 - 1/C2)$. Hold circuit 78 samples this value at the appropriate time and retains it during the subsequent measurement cycle. The output of hold circuit 78, representing $(1/C1 - 1/C2)$, is the electrical output of the system, which corresponds to the input acting on movable element 14 of the transducer.

The measurement cycle is repeated continuously, updating the value retained by hold circuit 78 to reflect any changes of the values of the reciprocals of the transducer capacitances C1 and C2.

The average electrical charge on the two transducer capacitances C1 and C2 is substantially equal because the product of current and time is substantially the same for both half-cycles. Thus, the electrostatic attraction between the movable element and each capacitor plate tends to be equal, and there is little resulting net force applied to the movable element. This effect is a concern generally for extremely sensitive transducers.

Since the output of the system is sensitive to many transducer and circuit parameters, it is desirable to identify such parameters so as to remove the negative effect thereof.

As noted above, the output of differentiator circuit 51 sequentially represents the values of 1/C1 and 1/C2, shown as portions 62 and 76 of waveform 61. These voltage levels are dependent on the gain of integrator circuit 29 and differentiator circuit 51, where "gain" is taken to mean the change of voltage level for a change of the value of C1 or C2. This gain is dependent upon various circuit parameters, and in particular is proportional to Vdrive, resistor 40 and capacitor 54, and inversely proportional to resistor 58. Since the same signal path, and thus the same circuit parameters, are used for both measurement half-cycles, the circuit gain is the same for the measurements of both 1/C1 and 1/C2. This common signal path or channel avoids errors which could otherwise be introduced if different and non-identical signal paths, and different gains, were utilized for the measurement of 1/C1 and 1/C2.

The effect of the common signal path is to ensure that the output will be zero for equal transducer capacitances, C1 and C2, independently of the actual value of the circuit gain, since the product of zero and any factor is zero. The output of the system for non-equal C1 and C2 is proportional to the circuit gain. Stated simply in traditional transducer terms, the zero is independent of circuit gain and the sensitivity is directly proportional to the circuit gain.

The operation of difference circuit 64 in certain circumstances may not be identical during each of the two half-cycles and could therefore affect the values of 1/C1 and 1/C2 unequally, negating the advantage of the common signal path. Difference circuit 64 and hold circuit 78 are used in many embodiments of the invention and are described below where its is shown that their operation is independent of circuit parameter values, thus retaining the advantage of the common signal path.

The transducer itself converts the effect of a physical input into a change of the capacitances C1 and C2. However, these capacitances may change due to other undesirable effects. For example, the values of C1 and C2 are proportional to the dielectric coefficient of the fluid between the capacitor plates 10 and 12 and the movable element 14. The capacitance values are also proportional to area of the plates and inversely proportional to the distance between the plates and the movable element. If these parameters were to change such as to affect C1 and C2 by the same factor, the zero output of the system would remain unaffected, and the sensitivity would change in direct proportional to this factor. This is analogous to the effect of the common signal path in the electronics, as described above.

Thus, scaling of the transducer capacitance, such as by changing the dimensions or the dielectric constant of the transducer by a factor common to both capacitances will not affect the output of the system when C1 and C2 are equal.

In another embodiment of the invention, enhanced performance may be obtained for the case of unequal transducer capacitances when the output is made independent of both the circuit gain and the scaling of the transducer capacitance. Although not functionally necessary, in practice this feature allows increased stability and lower cost due to the elimination of critical circuit and transducer parameters which would otherwise affect the sensitivity of the system.

In order to implement this independence, a quantity is generated which is dependent on all system parameters and component values in the same manner and to the same extent as the measurement of the difference of the reciprocal transducer capacitances. This quantity is selected as the sum of the reciprocal transducer capacitances.

The capacitance of the transducer measured between the fixed plates 10 and 12, Ctotal, is related to the capacitances C1 and C2 as follows:

$$\frac{1}{C_{total}} = \frac{1}{C1} + \frac{1}{C2}$$

This is the well understood relationship for capacitances connected in series. If the transducer capacitances were to be scaled, such as because of a scaling of the dimensions of the transducer, or a change in dielectric constant, the parameters 1/C1 and 1/C2 would change proportionately, as would 1/Ctotal. Likewise, if the circuit gain were to change, such as because of a change values of circuit components, the values corresponding to 1/C1, 1/C2 and 1/Ctotal would again change proportionately.

Therefore, the quantity $$\frac{\frac{1}{C1} - \frac{1}{C2}}{\frac{1}{C1} + \frac{1}{C2}}$$

is independent of all parameters which affect the output of the system. That is, if the difference of the transducer reciprocal capacitances, representing the displacement of the movable element 14 is divided by the sum of such values, the result is independent of both transducer capacitance scaling and of circuit gain.

If the movable element is not a flat plate, the linearity of the system without this normalization may be somewhat degraded. In practice, this normalization process significantly improves the linearity, since the non-linearity of the sum of the reciprocals is similar to the non-linearity of the difference of the reciprocals.

Referring now to FIG. 4, another embodiment of the invention is shown which employs the foregoing principle. Normalization is achieved by the provision of a sum circuit 66, a hold circuit 80 and a divide circuit 82 added to the circuit of FIG. 2. For purposes of simplification, the circuit of FIG. 4 shows only a portion of the transducer circuit of FIG. 2.

Sum circuit 66 produces a signal representative of the sum of the reciprocal capacitances 1/C1 and 1/C2, and hold circuit 80 retains this value. These circuits are similar to difference circuit 64 and hold circuit 78 shown in FIG. 2, and will be shown below to have substantially no sensitivity to circuit parameter values.

Divide circuit 82 is adapted to produce a signal representative of the ratio of the difference signal to the sum signal, which is the output of the system. In accordance with the forgoing discussion, the resulting output is insensitive to circuit gain and transducer capacitance scaling.

The process of division at the output, shown as block 82 in FIG. 4, requires relatively sophisticated circuitry and may itself introduce errors. Such a circuit is well known in the art. However, rather than requiring an actual mathematical division process, which is one alternative, it is more efficient to produce substantially the same result via direct feedback.

If the denominator of the above noted relationship were a constant, mathematical division would not be necessary. That is, if the sum were forced to be constant value, without altering the ratio of the difference to the sum, the division process would be avoided. This can be achieved simply by varying any parameter in the common signal path which directly controls the common signal path gain. One convenient parameter to vary is the voltage Vdrive which determines the measuring current of transducer capacitances C1 and C2. This adjustment of the circuit gain affects the difference of reciprocal capacitances in the same proportion as it affects their sum, so the ratio of the difference to the sum is unchanged.

FIG. 5 shows a circuit embodying the foregoing principle. The divide circuit 82 in FIG. 4 has been eliminated and the output of hold circuit 80 is connected to operational integrator circuit 90, comprised of differential amplifier 84, resistor 86, and capacitor 88. Following well understood circuit principles, the non-inverting input of amplifier 84 is connected to Vref, thereby establishing the inverting input, node 85, at the same potential by means of feedback through capacitor 88. The voltage level representing the sum of the reciprocal transducer capacitances is connected to one end of resistor 86. Since the other end of resistor 86, at node 85, is maintained at voltage Vref, a current proportional to the difference between the sum signal voltage and the reference voltage flows through resistor 86, and thus through capacitor 88. If the sum signal has changed from the nominal value of Vref, the output of amplifier 84, replacing the voltage Vdrive of FIG. 4, will change, thereby changing the gain of the common signal path and the sum signal voltage. When the sum signal voltage becomes equal to the reference voltage, no current will flow through resistor 86, and the output of amplifier 84 will no longer change. The gain of the common signal path has been adjusted to cause the sum signal to remain constant, without effect of the ratio of the difference to the sum signals. The values of resistor 86 and capacitor 88 do not affect the output of the system and are selected on the basis of achieving a desired feedback loop stability.

The output of the system, taken from the output of hold circuit 78, can be shown to be:

$$\frac{\frac{1}{C1} - \frac{1}{C2}}{\frac{1}{C1} + \frac{1}{C2}} Vref.$$

Thus, the output is the desired ratio of the difference and sum of 1/C1 and 1/C2, multiplied by the reference voltage, Vref. The circuit gain and transducer capacitance scaling have no effect on the output. If a parameter not of interest were to change, such as the dielectric coefficient in the transducer, the output of integrator circuit 90 would change so as to produce an new value for Vdrive which would return the output of the system to the value existing before the change. The output does not change so as to indicate a change in the position of the movable element, but rather remains constant to indicate no change in the position of the movable element.

The output is proportional to the reference voltage, Vref, which can be derived from a conventional solid state voltage source of high precision and stability. Alternatively, Vref may be made a variable value, applied from an external source, allowing direct control of the sensitivity of the transducer system.

In FIGS. 2, 4 and 5, difference circuit 64, sum circuit 66 and hold circuits 78 and 80 could include circuit parameters which affect the representations of 1/C1 and 1/C2 unequally, or the representations of the difference or sum of 1/C1 and 1/C2 in different proportions. Variations of these parameters could affect the output of the system, negating the advantages of the common signal channel and the normalization process.

FIGS. 6 and 7 illustrate respectively a circuit diagram and waveforms which further define the functions of difference circuit 64, sum circuit 66 and hold circuits 78 and 80 described above. The potential dependency of the operation of these circuits on parameter values has been avoided by using well understood capacitor charging techniques instead of conventional resistor difference and summing techniques.

In FIG. 6, the difference of the voltages corresponding to the reciprocals of the transducer capacitances C1 and C2 is derived by difference circuit 64 and retained by hold circuit 78. The output of differentiator circuit 51 of FIG. 2 is connected to the input of difference circuit 64, comprising a coupling capacitor 108, switch 112 and differential amplifier 110. During the latter part of phase 1 of the first half-cycle (FIG. 7), switch 112 is closed by waveform 127, causing capacitor 108 to be charged to the value of portion 62 of waveform 61. Switch 112 is then opened for the remainder of the measurement cycle. The input of amplifier 110 is simply waveform 61 decreased by the voltage across capacitor 108, which has been set to the 1/C1 value. During the latter part of phase 1 of the second half-cycle, the input to amplifier 110 is the value of portion 76 of waveform 61, corresponding to 1/C2 decreased by the potential across capacitor 108, which corresponds to 1/C1. The difference signal, waveform 113, appears at the output of amplifier 110, which is connected to function as a unity gain buffer. During the first half-cycle, the level of this signal, reference 114, is zero, representing (1/C1−1/C1). During the second half-cycle, the signal, reference 115, represents (1/C1−1/C2).

The hold circuit 78 includes a series switch 114, capacitor 118 and differential amplifier 116. During the latter part of phase 1 of the second half-cycle, switch 114 is closed by waveform 117, thereby charging capacitor 118 to the value at the output of difference circuit 64, which is the desired difference, (1/C1−1/C2). The output of the circuit 78 remains constant during the subsequent updating of capacitor 108 while switch 114 is open. The polarity of this signal is representative of the direction of displacement from center of the movable transducer element. The actual values of capacitors 108 and 118 are not critical, and no parameter dependencies have been introduced in the process of deriving the required difference voltage signal.

The sum of the voltages corresponding to the reciprocals of the transducer capacitances C1 and C2 is derived by sum circuit 66 and retained by hold circuit 80. The operation of these circuits is similar to that of the difference and hold circuits 64 and 78 with the exception that the sum capacitor 132 is reversed between half-cycles to provide a sum signal, rather than a difference signal.

Sum circuit 66 includes a capacitor 132, switches 126-130 and differential amplifier 134. During the latter part of phase 1 of the first half-cycle, switches 126 and 130 are closed by waveform 127, causing capacitor 132 to be charged to the value of portion 62 of waveform 61. Switches 126 and 130 are then opened and switch 128 is closed by waveform 129 for the remainder of the measurement cycle. During the latter part of phase 1 of the second half-cycle, the input to amplifier 134 is the value of portion 76 of waveform 61, corresponding to 1/C2, increased by the potential across capacitor 132, corresponding to 1/C1. This sum value, portion 148 of waveform 144, appears at the output of amplifier 134, which is connected as a unity gain buffer.

The hold circuit 80 includes a switch 138, a capacitor 136 and a differential amplifier 142. The hold circuit 80 functions identically to hold circuit 78, providing an output representative of the sum of the reciprocal transducer capacitances. Again, the actual values of capacitors 132 and 136 are not critical, and no parameter dependencies have been introduced in the process of deriving the required sum voltage signal.

Thus, the operations of deriving the difference and sum signals introduces no parameter sensitivity to the output of the system, and the benefits of the common signal path and normalization are not compromised.

In the forgoing embodiments, linearity of the system has been preserved by measuring the reciprocals of the transducer capacitances. The direct measurement of the reciprocals is provided by integrator circuit 29 and differentiator circuit 51. Significant circuit simplification could be achieved if the same result were obtained by measuring the capacitances instead of the reciprocal capacitances. In the embodiments shown in FIGS. 4 and 5, wherein the output is representative of the ratio of difference to the sum of the reciprocals, this can be achieved by realizing that the following algebraic identity applies:

$$\frac{\frac{1}{C1} - \frac{1}{C2}}{\frac{1}{C1} + \frac{1}{C2}} = \frac{C2 - C1}{C2 + C1}$$

Thus, all the benefits of the foregoing normalization apply if the output is representative of the difference of the transducer capacitances divided by their sum.

There is described in U.S. Pat. No. 4,584,885 a circuit method by which transducer capacitances can be measured independently of strap capacitance from the transducer elements to the environment and circuit input capacitance by means of driving the transducer capacitances with a time varying voltage and measuring the resulting current. If the voltage changes linearly with time, then the capacitance can be determined from both the slope of this drive signal and the resulting current by the relationship;

$$c = \frac{t}{e} i = \frac{i}{\text{slope}}$$

In the referenced patent, however, the output produced is representative only of the difference of the transducer capacitances, which is not linear for significant displacements, and does not provide for the normalization of scaling factors in the system. This is not necessary for the use described therein as the transducer is operated with force feedback to maintain essentially zero displacement of the movable transducer element, and the output is representative of the force required to maintain such zero displacement. Thus, the circuit is employed generally to detect a displacement from the nominal centered position, and is not concerned with linearity or the effect of variations of circuit gain.

Figure 9:
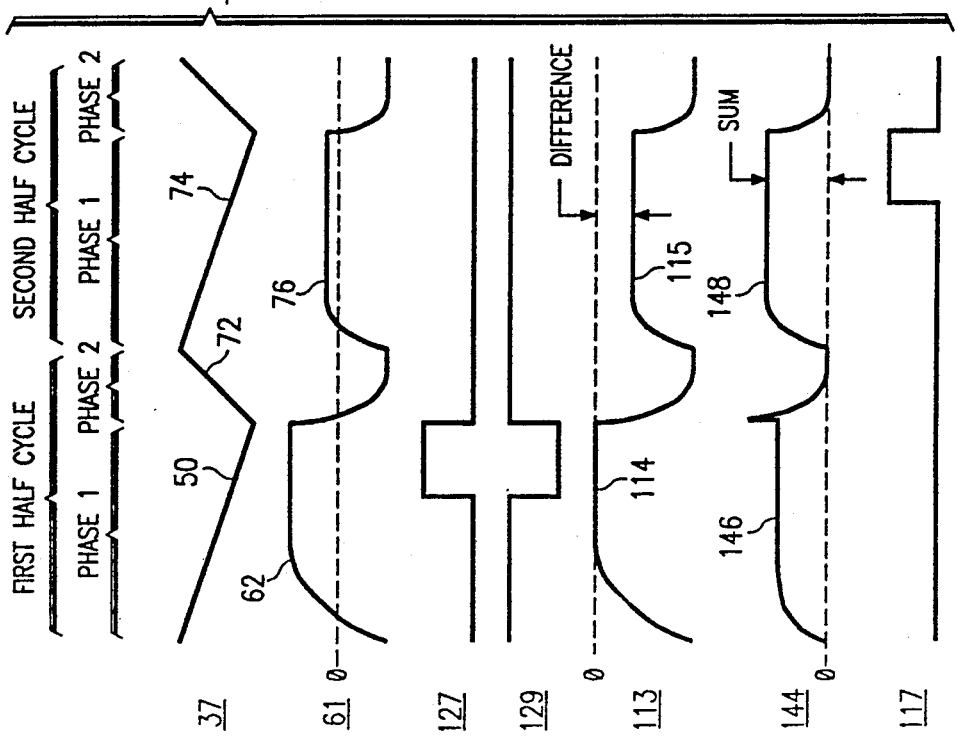
FIG. 9 comprises a series of waveforms illustrating the operation of the circuit of FIG. 8.

Referring now to FIGS. 8 and 9, a circuit diagram and waveforms show an embodiment of the invention The transducer capacitances C1 and C2 are elements of differentiator circuit 220 and are alternately driven by ramp generator 210. Differentiator circuit 220 produces an output signal having an amplitude proportional to the transducer capacitance, and demodulator circuit 230 translates this signal to a ground reference. The rest of the circuit is similar to that of FIG. 5, wherein difference circuit 64 derives the difference, (C1−C2), which is retained by hold circuit 78. The sum circuit 66 derives the sum, (C1+C2), which is retained by hold circuit 80. The sum is held constant by means of integrator circuit 90, eliminating the need to provide actual division. Alternatively, the division method shown in FIG. 4 could be utilized, wherein the ratio of the difference and the sum is provided by divider circuit 82.

Ramp generator 210 is of conventional design, providing an output at node 212 which is a triangular waveform 211 of alternating positive and negative voltage slopes. As in the previous embodiments, a complete measurement cycle consists of two alternate half-cycles. During the first half-cycle, switches 214 and 216, operated by waveform 215, are in the position shown. Such switches connect plate 10 of transducer capacitance C1 to the output of the ramp generator output and plate 12 of C2 to circuit ground. Differentiator circuit 220, comprising the transducer capacitance, resistor 224, capacitor 226 and differential amplifier 222, operates similarly to differentiator circuit 51 of FIG. 2. The non-inverting input of amplifier 222 is connected to circuit ground for establishing the inverting input, node 221, at a virtual ground potential by means of feedback through resistor 224. The common lead 22 of the transducer connects movable element 14 to this node.

During the first part of the first half-cycle, phase 1, the output of the ramp generator, portion 240 of waveform 211, maintains a constant positive slope. The resulting constant rate of change of voltage across C1 induces a constant current through C1 and thus through resistor 224 to the output of amplifier 222. After a short stabilization time, the output of amplifier 222, node 228, is a negative voltage level representative of the value of transducer capacitance C1, as shown at portion 250 of waveform 229. Frequency compensation of amplifier 222 may be required for large values of resistor 224 or transducer capacitance, and is provided by capacitor 226.

The capacitance between input node 221 and circuit ground is comprised of stray capacitance associated with the transducer movable element 14, capacitance associated with the circuitry itself and transducer capacitance C2 which has been connected to ground by switch 216. As this node is at virtual ground, the voltage across this capacitance cannot change and substantially no current can flow through it, thereby preventing any diversion of the signal current from transducer capacitance C1. Further, the current required to charge stray capacitance to ground associated with plate 10 of C1 is provided by the output of ramp generator 210 and does not affect the signal current developed through transducer capacitor C1.

Thus, the output of differentiator circuit 220, waveform 229, is unaffected by stray capacitances from the transducer elements to the environment and circuit input capacitance.

During phase 2 of the first half-cycle, the slope of the ramp generator output reverses, as shown at portion 242 of waveform 211. This causes the polarity of the output of differentiator circuit 220 to reverse, as shown at portion 252 of waveform 229.

Ideally, the levels of portions 250 and 252 of waveform 229, with due allowance for polarity, are proportional to C1 during both phase 1 and phase 2 of this first half-cycle. In practice, however, the input current of amplifier 222 may not be negligible as compared to the signal current developed through C1. This is particularly the case for the very small values of transducer capacitance encountered with miniature transducer designs. However, this amplifier input current flows equally and in the same direction through resistor 224 during both phase 1 and phase 2, the effect of which is simply to add a voltage offset to the differentiator output waveform 229. The peak-to-peak amplitude of this signal is not affected by this amplifier input current, and is thus an accurate representation of C1. An additional benefit of using the peak-to-peak value is that the signal level is effectively double the value obtained during only phase 1 or phase 2 alone. Further, the effect of unequal ramp generator slopes, waveform 211, during phase 1 and phase 2 is unimportant as this will not affect the peak-to-peak output.

The peak-to-peak voltage value generated for C1 by differentiator circuit 220 is converted to a ground referenced value by demodulator circuit 230, comprising coupling capacitor 231, switch 232 and differential amplifier 236. This circuit operates similarly to difference circuit 64 described above. During the latter part of phase 1, switch 232 is closed by waveform 233 such that capacitor 231 is charged to the negative voltage level of portion 250 of waveform 229. Switch 232 is opened for the remainder of the first half-cycle, during which time the input to amplifier 236 is simply waveform 229 decreased by the negative voltage across capacitor 231, the effect of which is addition. This signal, waveform 237, appears at the output of amplifier 236 which functions as a unity gain buffer. During the latter part of phase 1, the level of this signal, portion 259, is at zero volts. During the latter part of phase 2 of the first half-cycle, the level of this signal, portion 260, is the peak-to-peak output of differentiator circuit 220, which is proportional to transducer capacitance C1, now referenced to ground. This level is sampled by difference circuit 64 and sum circuit 66 at the time indicated by waveform 270.

A comparator (not shown) in switch control circuit 280 terminates the first half-cycle when the ramp generator output waveform 211 is approximately zero volts. This results in zero stored charge in C1, thereby preventing circuit transients when C1 and C2 are switched for the next half-cycle.

During the second half-cycle, switches 214 and 216 reverse the positions shown, as indicated by waveform 215, thus connecting transducer capacitance C2 to the ramp generator output and connecting C1 to circuit ground. The measurement process is repeated, and during the latter part of phase 2, the level of portion 264 of waveform 237 is proportional to transducer capacitance C2. This level is sampled by difference circuit 64 and sum circuit 66 at the time indicated by waveform 272. This completes the measurement cycle. The balance of the circuit is the same as that of FIG. 5 and operates as described above.

This embodiment generally provides the same functionality as that shown in FIG. 5. The output of the system is characterized by the following relationship:

$$\frac{C2 - C1}{C2 + C1} Vref.$$

Thus, the output is the desired ratio of the difference and sum of C1 and C2, multiplied by the reference voltage, Vref. Circuit gain and transducer capacitance scaling have substantially no effect on the output. If a parameter not of interest changes, such as the dielectric coefficient in the transducer, the output of integrator circuit 90 will change so as to produce an new value for Vdrive which will return the output of the system to the value existing before the change. The change in the parameter not of interest is therefore negated and the output of the system is thus made responsive to the parameter of interest, in the preferred embodiment, the movement of the transducer element 14.

Figure 11:
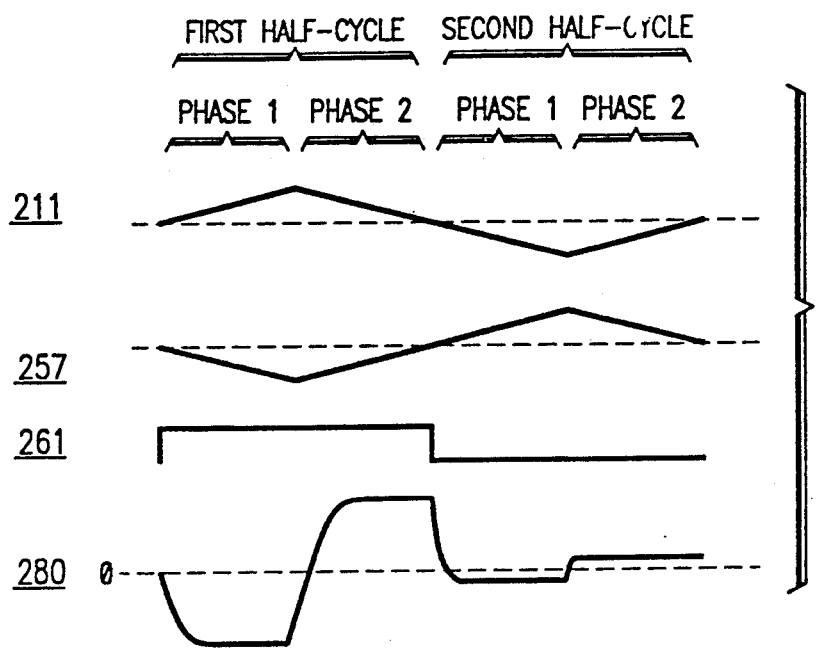
FIG. 11 comprises a series of waveforms of the circuit of FIG. 10.

Referring now to FIGS. 10 and 11, the circuit and waveforms of another embodiment of the invention are shown. In this embodiment, rather than measuring the value of each transducer capacitor C1 and C1 alternately, and then producing the difference and sum, the sum and difference of the two transducer capacitors are alternately measured directly. This allows significant circuit simplification while still realizing the functionality of the embodiments of FIGS. 4, 5 and 8. In comparison to FIG. 8, difference circuit 64 and sum circuit 66 have been eliminated. In addition, the method for switching the transducer capacitances has been revised, and an inverter circuit 248 has been added to provide an inverted representation of the output of ramp generator 210.

Inverter circuit 248, comprising differential amplifier 253 and resistors 249 and 251, is of conventional design. Its output, shown as waveform 257, is an inverted representation of the ramp generator output, waveform 211.

As before, a complete measurement cycle includes two alternate half-cycles. During the first half-cycle, the sum of the transducer capacitances C1 and C2 is measured. Switch 255, controlled by waveform 261, is in the position shown, thereby connecting the transducer capacitors C1 and C2 in parallel to the output of ramp generator 210. As is well known, the capacitance of parallel capacitors is simply the sum of the capacitances. The measurement proceeds exactly as for the circuit shown in FIG. 8, producing an output from differentiator circuit 220, shown as waveform 280, the peak-to-peak voltage of which is proportional to the sum of the transducer capacitances C1 and C2.

During the second half-cycle, the difference of the transducer capacitances C1 and C2 is measured. Switch 255 is operated so as to connect C2 to the inverted ramp signal, waveform 257. The resulting measurement current flowing through C2 is now of opposite polarity to the measurement current flowing through C1. The net current flowing from the movable transducer element to the input of amplifier 222 is the difference of the currents through C1 and C2. The peak-to-peak output voltage from differentiator circuit 220, waveform 280, is proportional to the difference of the transducer capacitors C1 and C2.

As in the circuit shown in FIG. 8, the peak-to-peak values for the sum and difference of C1 and C2 are converted to ground referenced values by demodulator circuit 230 and retained by hold circuits 78 and 80, and division of the difference by the sum is avoided by the use of feedback and a reference voltage Vref.

An alternative to the use of a single demodulator circuit 230 is to use separate demodulator circuits for the sum and difference values. This prevents the charging of the single demodulator capacitor to different voltage levels on alternate half-cycles, and requires the charge level on the separate capacitors to change only when the sum or difference signal values change, thereby further simplifying the design of the transducer circuits.

The addition of the inverter circuit 248 introduces a potential source of error that does not exist in any of the forgoing embodiments, as it is not in the common signal path. If the slopes of the inverted ramp signal, waveform 257, are not identical inverses of the corresponding slopes of the output of the ramp generator 210, waveform 211, the output of the system will not be zero for equal transducer capacitances C1 and C2. This requires that the ratio of the values of resistors 249 and 251 be unity so as to ensure that the gain of inverter circuit 248 is also unity. In practice, this constraint is relatively easy to satisfy and, considering the overall circuit simplification, is acceptable for all but the most demanding applications.

Additional circuit simplification may be desirable to further reduce cost and size of the transducer system. In many cases, immunity from transducer scaling and circuit gain effects is required, but the requirement for linearity can be relaxed or satisfied by other means. A circuit method which produces an output representative of the ratio of the two transducer capacitances allows such a simplification.

Figure 13:
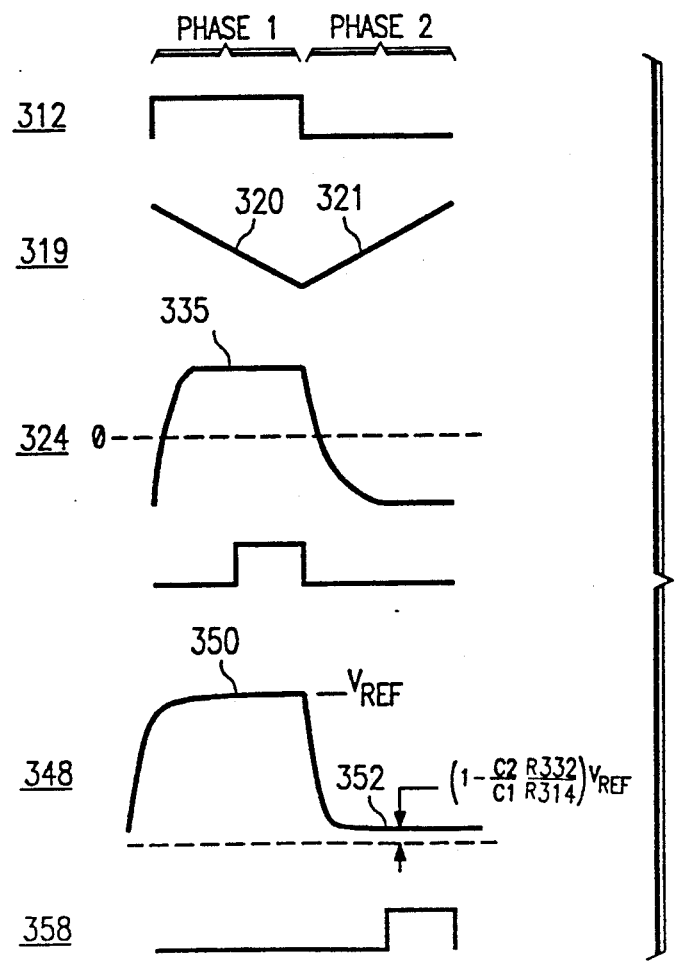
FIG. 13 comprises a series of waveforms of the circuit of FIG. 12.
Figure 12:
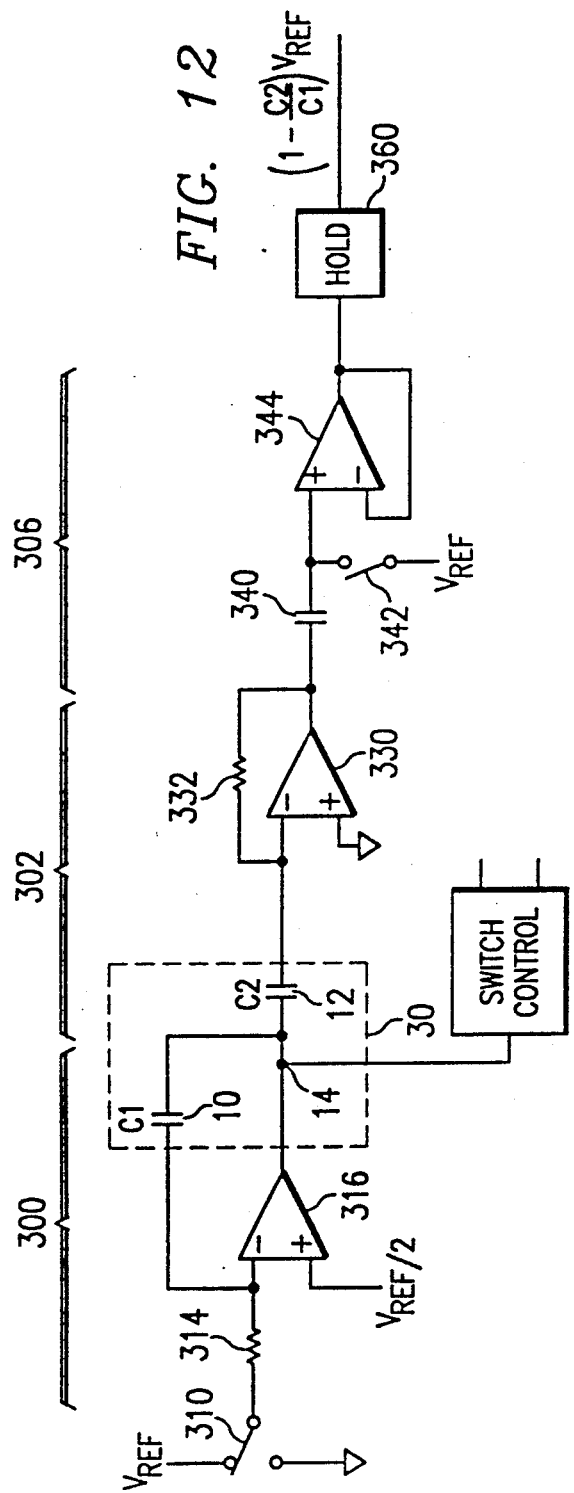
FIG. 12 is a circuit diagram showing an alternative embodiment in which a signal representative of the ratio of transducer capacitances C1 and C2 is directly generated, and an output function representative of the ratio minus unity is generated.

The circuit and waveforms of another embodiment of the invention are shown in FIGS. 12 and 13. The combination of an integrator circuit 300 and a differentiator circuit 302 is similar in concept to the arrangement of circuits 29 and 51 in FIG. 2. In this case, the capacitors associated with the integrator and differentiator circuits are the transducer capacitances C1 and C2, and no switching of C1 or C2 takes place. This circuit combination provides the ratio C2/C1 directly, without performing a mathematical division and without the use of feedback techniques.

Integrator circuit 300 is comprised of a resistor 314, a differential amplifier 316 and transducer capacitance C1. The measurement cycle includes only two phases. During phase 1, switch 310, controlled by waveform 312, is in the position shown, applying a reference voltage Vref to resistor 314. The other end of resistor 314 is connected to the inverting input of amplifier 316. The non-inverting input of amplifier 316 is connected to a voltage of approximately Vref/2, thus establishing the inverting input at the same value by means of feedback through C1. The resulting current in resistor 314 flows through transducer capacitance C1 and produces an output from amplifier 316 which is a negative voltage ramp, portion 320 of waveform 319. During phase 2 of the cycle, the position of switch 310 is reversed and applies zero volts to resistor 314, the other end of which remains at a potential of Vref/2. The current through resistor 314 reverses, thereby reversing the current through C1, and reversing the slope of the output of amplifier 316, portion 321 of waveform 319. The value of this slope is derived from the relationship:

$$\frac{e}{t} = \frac{Vref}{2(R314)C1}$$

and its algebraic sign is negative for phase 1 and positive for phase 2.

This signal is coupled to a differentiator circuit 302, comprised of a resistor 332, a differential amplifier 330 and the transducer capacitance C2. The output of this circuit shown as waveform 334, is a voltage derived from the relationship:

$$V334 = \frac{e}{t}(R332)C2$$

Using the relationship above for e/t, and multiplying by two to obtain the peak-to-peak value, $$V334 \text{ (peak-to-peak)} = \frac{C2}{C1} \frac{R332}{R314} Vref.$$

Thus, the peak-to-peak output of differentiator circuit 302 is proportional to the ratio of the transducer capacitances C1 and C2. Transducer capacitance scaling, such as caused by a change of dielectric coefficient, will act on both capacitances in equal proportion and thus have substantially no effect on the output.

Assuming R314 and R332 are equal, and that transducer capacitances C1 and C2 are equal in the absence of a physical input to the transducer, this output value will be Vref. Since it is desirable to have zero output for zero input, this output must be subtracted from Vref.

Rather than implement the subtraction using traditional resistance differencing techniques which are sensitive to circuit parameter values, the required subtraction is provided by a demodulator circuit 306 which uses capacitor charging techniques. This circuit, comprised of a capacitor 340, a switch 342 and a differential amplifier 344, is similar to demodulator circuit 230 in FIG. 8, but with the demodulator switch connected to Vref instead of circuit ground. The output of this circuit, shown as waveform 348, is a representation of the input, waveform 334, wherein the voltage level corresponding to portion 335 of waveform 334 has been shifted to a value of Vref, shown as portion 350 of waveform 348. The voltage level of portion 352 of waveform 348 represents $$Vref - V334 \text{ (peak-to-peak)}$$

which is equivalent to $$Vref - \frac{C2}{C1} \frac{R332}{R314} Vref$$

or $$\left[1 - \frac{C2}{C1} \frac{R332}{R314}\right] Vref$$

which is the desired output. A hold circuit 360, similar to hold circuits 78 and 80, and controlled by waveform 358, holds this value, which becomes the output of the system.

If the ratios C2/C1 and R332/R314 are unity, the peak-to-peak value of waveforms 334 and 348 is simply Vref, and the voltage level of portion 352 of waveform 348 will be at zero potential. As the ratio C2/C1 varies from unity due to a physical input to the transducer, this voltage level will vary in proportion, and its polarity will be indicative of the direction of displacement of the transducer movable element.

For a given unbalance of transducer capacitances C1 and C2, the output of the circuit of FIG. 12 will be significantly greater than the output of the circuits described above. Further, as the measurement cycle includes only two phases, as contrasted with four phases for the previous embodiments, relatively higher sampling rates may be used.

The ratio of resistors R332 and R314 must remain unity, as was the case for resistors 249 and 251 in the embodiment shown in FIG. 10, or the output of the system will not be zero for equal transducer capacitances C1 and C2. Resistors of adequate quality and tolerance are readily obtainable for use in this simplified embodiment.

The use of the voltage level of Vref/2 at the non-inverting input of amplifier 316 is a circuit convenience to provide symmetrical signal waveforms, and does not affect the peak-to-peak amplitude of signal 334, or the output of the system.

The foregoing embodiments describe circuits for achieving very accurate and stable operation. Certain bias (zero) and span (full scale) adjustments may be incorporated to allow user calibration. Further, compensation of transducer temperature coefficients and non-linearity may be required. Such adjustments could be provided in additional conventional circuits which further process the outputs shown. However, the circuits as shown provide a convenient means of implementing such adjustments and minimizing additional sources of inaccuracy.

The zero of the system can be adjusted easily by adding an offset to difference circuit 64 in FIGS. 2, 4, 5, and 8. In this circuit, shown in detail in FIG. 6, the connection of switch 112 to circuit ground may be replaced with a connection to an adjustable reference voltage source, such as a potentiometer connected to stable power supply sources. This reference voltage will add directly to the output of the system and provide a zero adjustment. If this voltage were to include a component sensitive to temperature, such as from a temperature sensitive resistor or diode, adjustment of this component would provide compensation for temperature induced variations of the transducer zero output.

This adjustment may be implemented in the circuits of FIGS. 8 and 10 in a similar fashion by connecting the switch in demodulator circuit 230 to an offset voltage instead of circuit ground. In the circuit of FIG. 12, the offset voltage would be added to Vref at its connection to the switch in demoduator circuit 306.

The span, or sensitivity, of the system can be adjusted by varying Vdrive in FIGS. 2 and 4, and by varying Vref in FIGS. 5, 8, 10 and 12. Again, this voltage could include a component sensitive to temperature, providing compensation for temperature induced variations of the transducer sensitivity. Further, this voltage could include a component sensitive to the output of the system itself, providing for correction of transducer non-linearities.

The accuracy of the electronics is determined chiefly by circuit design details. In the embodiments utilizing normalization or ratio techniques, the accuracy and stability of passive circuit components is generally not a concern. The requirement for a matched resistor pair in the circuits shown in FIGS. 10 and 12 has been noted above, and is acceptable in view of the simplification achieved by such circuits.

The practical range of transducer capacitance values is very large. The upper limit is well beyond practical transducer values. The lower limit is determined primarily by the gain-bandwidth product and input noise of the integrator and differentiator amplifiers. Lower values of transducer capacitance result in lower values of the capacitance measurement current, higher amplifier gain requirements and greater affect of amplifier input noise. Alternatively, the measurement current may be increased by the use of greater ramp slopes, resulting in higher operating frequencies and, again, higher amplifier bandwidth requirements.

The various embodiments of the invention have been constructed using common integrated circuit operational amplifiers incorporating JFET input devices and standard CMOS integrated circuits for the logic and switch functions. In tests conducted with transducers having capacitance values of approximately 5 picofarads, full-scale changes of capacitance of approximately 0.5 picofarads, measurement cycle rates in the range of 0.1 to 1.0 milliseconds and power supply currents of a few milliamperes, output noise and stability were of the order of tens of parts per million of full scale signal. This corresponds to a change of transducer capacitance on the order of 0.01 femtofarads.

If a higher sampling rates are desired, particularly in combination with very low transducer capacitances, discrete amplifier designs may be required. This in turn may raise the circuit power requirements.

Consideration should also be given to proper physical packaging techniques to prevent coupling of various circuit switching signals to sensitive circuit nodes through inadvertent stray capacitance.

A significant technical advantage of the invention is that as a transducer element responds to input changes in producing changes in a capacitance, the capacitance changes can be accurately and linearly converted into a corresponding electrical signal. Another significant technical advantage of the invention is that in capacitance transducers, extraneous capacitance between the transducer capacitance and circuit common have no effect on the accurate measurement of the transducer capacitance. Another significant technical advantage of the invention is that in differential-type capacitance transducers, a feedback can be employed to render the conversion and operation substantially independent of parameters, except the parameter of interest, i.e., displacement of transducer element. Another significant technical advantage presented by the invention is that in differential-type capacitance transducers, each capacitance can be switched into and out of a circuit defining a common channel, thereby eliminating differences and performance variations common to multiple channel circuits. Another technical advantage of the invention is that a highly accurate and linear conversion can be carried out using capacitor charging techniques, thereby simplifying circuit design, assembly and cost. Another technical advantage of the invention is that high tolerance and expensive components are not required in order to construct a circuit according to the various embodiments of the invention in order to realize the accurate and linear conversion of capacitance into a corresponding electrical signal.

The foregoing discloses circuits and techniques for the accurate conversion of transducer capacitances into corresponding electrical signals. While the preferred and other embodiments of the invention have been disclosed with reference to specific transducer device and circuit fabrications and corresponding conversion methods, it is to be understood that many changes in detail may be made as a matter of engineering choices without departing from the spirit and scope of the invention, as defined by the appended claims.

What is claimed is:

1. In a transducer of the type in which a displacement of an element is sensed capacitively, a method for converting the capacitance into a corresponding electrical signal, comprising the steps of:

applying a substantially constant current to a first terminal of the capacitance thereby charging the capacitance;

maintaining said first terminal of the capacitance at a substantially constant voltage potential with respect to a circuit common;

deriving an output voltage signal from a second terminal of the capacitance the rate of change of which is representative of the capacitance and generally independent of extraneous capacitance between said capacitance terminals and said circuit common; and differentiating said output voltage signal to produce a differentiated output signal the amplitude of which is generally constant with time and representative of said capacitance.

2. The method of claim 1, further including connecting said capacitance between an input and output of a high gain amplifier so as to form an integrator, and applying said constant current to said amplifier input, and said output voltage signal is derived from said amplifier output.

3. The method of claim 1 or claim 2, wherein said transducer is of a differential capacitance type, defined by a first and second capacitance, further including the step of alternately driving said first and second capacitance to produce an output voltage signal the rate of change of which is alternately representative of the associated said capacitance.

4. The method of claim 3, further including the step of differentiating said output voltage signal to produce a differentiated output signal the amplitude of which is alternately generally constant with time and representative of said associated capacitance.

5. The method of claim 4, further including the step of processing said differentiated output signal to produce a difference between said amplitudes, said difference representative of the difference between said associated capacitances.

6. The method of claim 5, further including the steps of processing said differentiated output signal to produce a sum of said amplitudes, and dividing said difference by said sum, thereby producing a ratio which is generally independent of the magnitude of said capacitances.

7. The method of claim 6, wherein said applied constant current is derived from said sum so as to maintain said sum equal to a constant, thereby modifying said difference to represent said ratio.

8. The method of claim 7, wherein said difference and said sum are produced with constant gain, thereby causing said ratio to be dependent only on said constant and the difference between said capacitances.

9. In a transducer of the type in which a displacement of an element is sensed by a differential capacitance defined by a first and second capacitance, a method for converting the capacitances into a corresponding electrical signal, comprising the steps of:

alternately applying a drive voltage characterized by a constant rate of change with time to an independent terminal of said first capacitance and said second capacitance;

maintaining a common terminal of said capacitances at a constant voltage potential with respect to a circuit common; and deriving an output current signal from said common terminal which is alternately representative of the first and second capacitances and generally independent of extraneous capacitances between said capacitance terminals and said circuit common.

10. The method of claim 9, wherein said common terminal is connected to an input of a high gain amplifier, a resistance is connected from said amplifier input to an output of said amplifier so as to form a differentiator, and further including the step of the amplitude of which is alternately representative of values of said first and second capacitances.

11. The method of claim 9 or claim 10, further including the step of processing said output voltage signal to produce a difference between said alternate amplitudes, said difference being representative of the difference between said capacitances.

12. The method of claim 11, further including the steps of processing said output voltage signal to produce a sum of said alternate amplitudes, and dividing said difference by said sum, thereby producing a ratio which is generally independent of the magnitude of said capacitances.

13. The method of claim 12, further including deriving said drive voltage from said sum so as to maintain said sum equal to a constant, thereby modifying said difference to represent said ratio.

14. The method of claim 13, further including producing said difference and said sum with a constant gain, thereby causing said ratio to be dependent only on said constant and said difference between said capacitances.

15. In a transducer of the type in which a displacement of an element is sensed by a differential capacitance, defined by a first and second capacitance, a method for converting the difference between said first and second capacitance into a corresponding electrical signal, comprising the steps of:

applying a first drive voltage characterized by a constant rate of change with time to an independent terminal of said first capacitance;

applying a second drive voltage characterized by a constant rate of change with time and of opposite sense to said first drive voltage to an independent terminal of said second capacitance;

maintaining a common terminal of the capacitances at a constant voltage potential with respect to a circuit common; and deriving an output current signal from said common terminal which is representative of the difference between said first and second capacitances and generally independent of extraneous capacitances between the capacitance terminals and said circuit common.

16. The method of claim 15, wherein said common terminal is connected to the input of a high gain amplifier, a resistance is connected from said amplifier input to an output of said amplifier so as to form a differentiator, and deriving an output voltage signal from said amplifier output which is representative of a difference of said capacitances.

17. In a transducer of the type in which a displacement of an element is sensed by a differential capacitance, defined by a first and second capacitance, a method for alternately converting a difference between said first and second capacitance and a sum of said first and second capacitance into corresponding electrical signals, comprising the steps of:

applying a first drive voltage characterized by a constant rate of change with time to an independent terminal of said first capacitance for a first period of time;

applying a second drive voltage characterized by a constant rate of change with time and of opposite sense to said first drive voltage to an independent terminal of said second capacitance for said first period of time;

applying said first drive voltage to said independent terminals of the first and second capacitances for a second period of time;

maintaining a common terminal of the capacitances at a constant voltage potential with respect to a circuit common; and deriving an current signal from said common terminal which is alternately representative of said difference and said sum generally independent of extraneous capacitance between the capacitance terminals and said circuit common.

18. The method of claim 17, wherein said common terminal is connected to an input of a high gain amplifier, a resistance is connected from said amplifier input to an amplifier output so as to form a differentiator, and deriving an output voltage signal from said amplifier output which is alternately representative of said difference and said sum.

19. The method of claim 17 or claim 1, further including the step of dividing said difference by said sum to produce a ratio which is generally independent of the magnitude of the transducer capacitances.

20. The method of claim 19, further including deriving said first and second drive voltages from said sum so as to maintain said sum equal to a constant, thereby modifying said difference to represent said ratio.

21. The method of claim 20, further including producing said difference and said sum with a constant gain, thereby causing said ratio to be dependent only on said constant.

22. In a transducer of the type in which a displacement of an element is sensed by a differential capacitance/ defined by a first and second capacitance, a method for converting a ratio of said second and said first capacitance into a corresponding electrical signal, comprising the steps of:

applying a substantially constant current to an independent terminal of said first capacitance;

maintaining said terminal at a substantially constant voltage potential with respect to a circuit common;

deriving an output voltage signal from a common terminal of said capacitances the rate of change of which is representative of said first capacitance; and deriving an output current signal from an independent terminal of said second capacitance which is representative of the ratio of said second and said first capacitances.

23. The method of claim 22, wherein the independent terminal of said first capacitance is connected to an input of a first high gain amplifier, said constant current is applied to said input, said common terminal is connected to an output of said first amplifier thereby forming an integrator, the independent terminal of said second capacitance is connected to an input of a second high gain amplifier, a resistance is connected from said second amplifier input to said second amplifier output thereby forming a differentiator, and deriving an output of said second amplifier which is representative of said ratio.

24. In a transducer of the type in which a displacement of an element is sensed capacitively, a circuit for converting the capacitance into a corresponding electrical signal, comprising:

means for applying a substantially constant current to a first terminal of the capacitance thereby charging the capacitance;

means for maintaining said first terminal of the capacitance at a substantially constant voltage potential with respect to a circuit common; and means for deriving an output voltage signal from a second terminal of the capacitance the rate of change of which is representative of the capacitance and generally independent of extraneous capacitance between said capacitance terminals and said circuit common.

25. The transducer circuit of claim 24, further including a capacitance connected between an input and output of a high gain amplifier so as to form an integrator, and means for applying said constant current to said amplifier input, and said output voltage signal is derived from said amplifier circuit.

26. The transducer circuit of claim 24 or claim 25, further including means for differentiating said output voltage signal to produce a differentiated output signal the amplitude of which is generally constant with time and representative of said capacitance.

27. The transducer circuit of claim 24 or claim 25, wherein said transducer is of a differential capacitance type, defined by a first and a second capacitance, further including means for alternately connecting said first and second capacitance to said constant current to produce respective output voltage signals the rate of change of which are alternately representative of the capacitances.

28. The transducer circuit of claim 27, further including means for differentiating each said output voltage signal to produce alternate differentiated output signals the amplitudes of which are generally constant with time and respectively representative of said capacitances.

29. The transducer circuit of claim 28, further including means for processing said differentiated output signals to produce a difference between said amplitudes, said difference being representative of the difference between said capacitances.

30. The transducer circuit of claim 29, further including means for processing said differentiated output signals to produce a sum of said amplitudes, and means for dividing said difference by said sum, thereby producing a ratio which is generally independent of the magnitude of said capacitance.

31. The transducer circuit of claim 30, further including means for deriving said drive current from said sum so as to maintain said sum equal to a constant, thereby modifying said difference to represent said ratio.

32. The transducer circuit of claim 31, further including means for producing said difference and said sum with constant gain, thereby causing said ratio to be dependent only on said constant and the difference between said capacitances.

33. In a transducer of the type in which a displacement of an element is sensed by a differential capacitance, defined by a first and a second capacitance, a circuit for converting the capacitances into a corresponding electrical signal, comprising:

means for alternately applying a drive voltage characterized by a constant rate of change with time to an independent terminal of said first capacitance and then to said second capacitance;

means for maintaining a common terminal of said capacitances at a constant voltage potential with respect to a circuit common; and means for deriving an output voltage signal from said common terminal which is alternatively representative of the associated capacitances and generally independent of extraneous capacitances between said capacitance terminals and said circuit means.

34. The transducer circuit of claim 33, wherein said common terminal is connected to an input of a high gain amplifier, a resistance is connected from said amplifier input to an output of said amplifier so as to form a differentiator, and means for deriving an output voltage signal from said amplifier output the amplitude of which is alternately representative of said associated capacitance.

35. The transducer circuit of claim 33 or claim 34, further including means for processing said output voltage signal to produce a difference between said alternate amplitudes, said difference being representative of the difference between said capacitances.

36. The transducer circuit of claim 35, further including means for processing said output voltage signal to produce a sum of said alternate amplitudes, and means for dividing said difference by said sum, thereby producing a ratio which is generally independent of the magnitude of said capacitances.

37. The transducer circuit of claim 36, further including means for deriving said drive voltage from said sum so as to maintain said sum equal to a constant, thereby modifying said difference to represent said ratio.

38. The transducer circuit of claim 37, further including means for producing said difference and said sum with a constant gain, thereby causing said ratio to be dependent only on said constant and said difference between said capacitances.

39. In a transducer of the type in which a displacement of an element is sensed by a differential capacitance, defined by a first and second capacitance, a circuit for converting the difference between said first and second capacitance into a corresponding electrical signal, comprising:

means for applying a first drive voltage characterized by a constant rate of change with time to an independent terminal of said first capacitance;

means for applying a second drive voltage characterized by a constant rate of change with time and of opposite sense to said first drive voltage to an independent terminal of said second capacitance;

means for maintaining a common terminal of the capacitances at a constant voltage potential with respect to a circuit common; and means for deriving an output current signal from said common terminal which is representative of the difference between said first and second capacitances and generally independent of extraneous capacitances between the capacitance terminals and said circuit common.

40. The transducer circuit of claim 39, wherein said common terminal is connected to the input of a high gain amplifier, a resistance is connected from said amplifier input to said amplifier output so as to form a differentiator, and means for deriving an output voltage signal from said amplifier output which is representative of said capacitance difference.

41. In a transducer of the type in which a displacement of an element is sensed by a differential capacitance, defined by a first and second capacitance, a circuit for alternately converting a difference between said first and second capacitance and a sum of said first and second capacitance into corresponding electrical signals, comprising:

means for applying a first drive voltage characterized by a constant rate of change with time to an independent terminal of said first capacitance for a first period of time;

means for applying a second drive voltage characterized by a constant rate of change with time and of opposite sense to said first drive voltage to an independent terminal of said second capacitance for said first period of time;

means for applying said first drive voltage to said independent terminals of the first and second capacitances for a second period of time;

means for maintaining a common terminal of the capacitances at a constant voltage potential with respect to a circuit common; and means for deriving an current signal from said common terminal which is alternately representative of said difference and said sum, generally independent of extraneous capacitance, between the capacitance terminals and said circuit common.

42. The transducer circuit of claim 41, wherein said common terminal is connected to an input of a high gain amplifier, a resistance is connected from said amplifier input to an amplifier output so as to form a differentiator, and means for deriving an output voltage signal from said amplifier output which is alternately representative of said difference and said sum.

43. The transducer circuit of claim 41 or claim 42, further including means for dividing said difference by said sum to produce a ratio which is generally independent of the magnitude of the transducer capacitances.

44. The transducer circuit of claim 43, further including means for deriving said first and second drive voltages from said sum so as to maintain said sum equal to a constant, thereby modifying said difference to represent said ratio.

45. The transducer circuit of claim 44, further including means for producing said difference and said sum with a constant gain, thereby causing said ratio to be dependent only on said constant.

46. In a transducer of the type in which a displacement of an element is sensed by a differential capacitance, defined by a first and second capacitance, a circuit for converting a ratio of said second and said first capacitance into a corresponding electrical signal, comprising:

means for applying a substantially constant current to an independent terminal of said first capacitance;

means for maintaining said terminal at a substantially constant voltage potential with respect to a circuit common;

means for deriving an output voltage signal from the common terminal of said capacitances the rate of change of which is representative of said first capacitance; and means for deriving an output current signal from an independent terminal of said second capacitance which is representative of the ratio of said second and said first capacitances.

47. The transducer circuit of claim 46, wherein the independent terminal of said first capacitance is connected to an input of a first high gain amplifier, said constant current is applied to said input, said common terminal is connected to an output of said first amplifier thereby forming an integrator, the independent terminal of said second capacitance is connected to an input of a second high gain amplifier, a resistance is connected from said second amplifier input to said second amplifier output thereby forming a differentiator, and means for deriving an output of said second amplifier which is representative of said ratio.

* * * * *